United States Patent
Goldenberg et al.

(10) Patent No.: US 7,245,627 B2
(45) Date of Patent: Jul. 17, 2007

(54) SHARING A NETWORK INTERFACE CARD AMONG MULTIPLE HOSTS

(75) Inventors: Dror Goldenberg, Zichron Yaakov (IL); Gil Bloch, Kiryat Ata (IL); Gil Stoler, Nofit (IL); Diego Crupnicoff, Buenos Aires (AR); Michael Kagan, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 1096 days.

(21) Appl. No.: 10/127,710

(22) Filed: Apr. 23, 2002

(65) Prior Publication Data

US 2003/0200315 A1 Oct. 23, 2003

(51) Int. Cl.
*H04L 12/56* (2006.01)
(52) U.S. Cl. .................... 370/419; 370/463
(58) Field of Classification Search ........ 370/389–390, 370/394, 395.5, 0.5, 412–419, 463, 428–429
See application file for complete search history.

(56) References Cited

U.S. PATENT DOCUMENTS

| 7,103,888 | B1* | 9/2006 | Cayton et al. .............. 719/313 |
| 2002/0152327 | A1* | 10/2002 | Kagan et al. ............... 709/250 |
| 2002/0172195 | A1* | 11/2002 | Pekkala et al. ............ 370/360 |
| 2002/0191599 | A1* | 12/2002 | Parthasarathy et al. ..... 370/389 |
| 2003/0014544 | A1* | 1/2003 | Pettey ........................ 709/249 |
| 2003/0065856 | A1* | 4/2003 | Kagan et al. ............... 710/263 |
| 2004/0213220 | A1* | 10/2004 | Davis ......................... 370/389 |

OTHER PUBLICATIONS

InfiniBand Architecture Specification, Release 1.0, vol. 1, pp. 58-63 and 69, Oct. 2000.
Microsoft, pp. 1-42, "Remote NDIS Specification", Jan. 8, 2001.
www.tality.com/solutions/wireless/gbemac.html, pp. 1-3, "Tality Solutions:Gigabit Ethernet Mac".
L. Cleeton, A Presentation from the Microsoft WinHec2001 Conference, "Remote NDIS Overview".
IEEE Std 802.3 Edition, pp. 1-82, "Part 3:Carrier Sense Multiple Access With Collision Detection (CSMA/CD)Access Method and Physical Layer Specifications", 2000.
www.tality.com/solutions/wireless/gbemac.html, pp. 1-3, "Tality Solutions:Gigabit Ethernet Mac", Nov. 12, 2001.
L. Cleeton, A Presentation from the Microsoft WinHec2001 Conference, "Remote NDIS Overview", 2001.

* cited by examiner

*Primary Examiner*—Chi Pham
*Assistant Examiner*—Thai Hoang
(74) *Attorney, Agent, or Firm*—Mark M. Friedman

(57) ABSTRACT

A network interface device includes a fabric interface, adapted to exchange messages over a switch fabric with a plurality of host processors, the messages containing data, and a network interface, including one or more ports adapted to be coupled to a network external to the switch fabric. Message processing circuitry is coupled between the fabric interface and the network interface, so as to enable at least first and second host processors among the plurality of the host processors to use a single one of the ports substantially simultaneously so as to transmit and receive frames containing the data over the network.

49 Claims, 10 Drawing Sheets

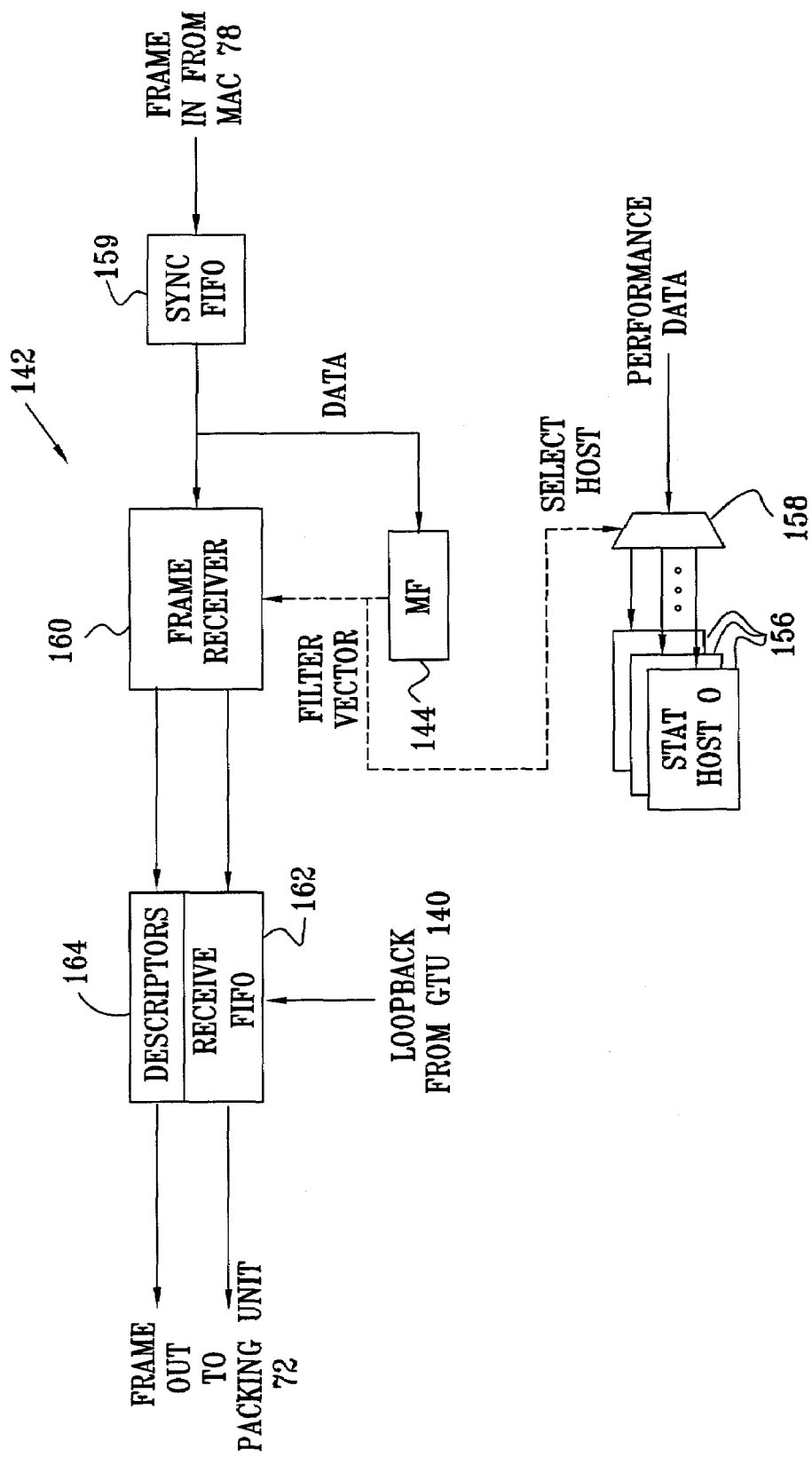

SHARING A NETWORK INTERFACE CARD AMONG MULTIPLE HOSTS

FIELD OF THE INVENTION

The present invention relates generally to computing systems, and specifically to systems that use packet-switching fabrics to connect a host computer to peripheral devices.

BACKGROUND OF THE INVENTION

In conventional computer systems, a host computer is linked to a network using a network interface card (NIC), which is connected to the internal bus of the host. The most common example of this type of connection is the use of Ethernet network adapter cards, which plug into the Peripheral Component Interface (PCI) bus of a personal computer and link the computer to a 10BASE-T or 100BASE-T local-area network (LAN). Ethernet cards of this sort are widely available and inexpensive. They provide the necessary physical layer connection between the host and the serial LAN or WAN medium, as well as performing some media access control (MAC) layer functions. Network- and transport-layer protocol functions, such as Internet Protocol (IP) and Transmission Control Protocol (TCP) processing, are typically performed in software by the host.

As network speeds increase, moving up to Gigabit Ethernet (GbE) and Ten Gigabit Ethernet, for example, this sort of simple NIC is no longer adequate. Working in a GbE environment at wire speed typically requires that the NIC have a much faster and more costly physical interface and MAC handling functions. It is also desirable that the NIC take on a larger share of the higher-level protocol processing functions. NICs have recently been introduced with "protocol offloading" capability, in the form of dedicated hardware processing resources to relieve the host of network layer (IP) processing and even transport and higher-layer functions. Such hardware resources reduce the processing burden on the host and therefore eliminate a major bottleneck in exploiting the full bandwidth available on the network, but they also add substantially to the cost of the NIC. Since a typical host communicates with a LAN or WAN only intermittently, in short bursts, the high-speed processing capabilities of the NIC are unused most of the time.

The computer industry is moving toward fast, packetized, serial input/output (I/O) bus architectures, in which computing hosts and peripherals, such as NICs, are linked by a system area network (SAN), commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the *InfiniBand Architecture Specification,* Release 1.0 (October, 2000), which is incorporated herein by reference. This document is available from the InfiniBand Trade Association at www.infinibandta.org.

A host processor (or host) connects to the IB fabric via a fabric interface adapter, which is referred to in IB parlance as a host channel adapter (HCA). Peripherals are connected to the fabric by a target channel adapter (TCA). Client processes running on the host communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously. To send and receive communications over the fabric, the client initiates work requests (WRs), which causes work items, called work queue elements (WQEs), to be placed in the appropriate queues. The channel adapter then executes the work items, so as to communicate with the corresponding QP of the channel adapter at the other end of the link.

For any given operation, the QP that initiates the operation, i.e. injects a message into the fabric, is referred to as the requester, while the QP that receives the message is referred to as the responder. (A given QP can be both a requester and a responder in different operations.) An IB operation is defined to include a request message generated by the requester and, as appropriate, its corresponding response generated by the responder. (Not all request messages have responses.) Each QP is configured for a certain transport service type, based on how the requesting and responding QPs interact. Both the source and destination QPs must be configured for the same service type. The IB specification defines four service types: reliable connection, unreliable connection, reliable datagram and unreliable datagram. The reliable services require that the responder acknowledge all messages that it receives from the requester, in order to guarantee reliability of message delivery.

Each message consists of one or more IB packets, depending on the size of the message payload compared to the maximum transfer unit (MTU) of the message path. Typically, a given channel adapter will serve simultaneously both as a requester, transmitting requests and receiving responses on behalf of local clients, and as a responder, receiving requests from other channel adapters and returning responses accordingly. Request messages include, inter alia, remote direct memory access (RDMA) write and send requests, all of which cause the responder to write data to a memory address at its own end of the link, and RDMA read requests, which cause the responder to read data from a memory address and return it to the requester. Atomic read-modify-write requests can cause the responder both to write data to its own memory and to return data to the requester. Most response messages consist of a single acknowledgment packet, except for RDMA read responses, which may contain up to $2^{31}$ bytes of data, depending on the data range specified in the request. RDMA write and send requests may likewise contain up to $2^{31}$ bytes of data. RDMA read and write requests specify the memory range to be accessed by DMA in the local memory of the responder. Send requests rely on the responder to determine the memory range to which the message payload will be written.

Although IB does not explicitly define quality of service (QoS) levels, it provides mechanisms that can be used to support a range of different classes of service on the network. Each IB packet carries a Service Level (SL) attribute, indicated by a corresponding SL field in the packet header, which permits the packet to be transported at one of 16 service levels. The definition and purpose of each service level is not specified by the IB standard. Rather, it is left as a fabric administration policy, to be determined between each node and the subnet to which it belongs. Thus, the assignment of service levels is a function of each node's communication manager and its negotiation with a subnet manager. As a packet traverses the fabric, its SL attribute determines which virtual lane (VL) is used to carry the packet over the next link. For this purpose, each port in the fabric has a SL to VL mapping table that is configured by subnet management.

IB fabrics are well suited for multi-processor systems and allow input/output (I/O) units, such as a network interface device with a suitable TCA, to communicate with any or all of the processor nodes in a system. In this manner, a NIC can be used by multiple hosts over an IB fabric to access an external network, such as an Ethernet LAN or WAN. NICs known in the art, however, have only a single network port and are designed to serve a single host. Although the IB fabric and protocols provide the means for multiple hosts to communicate with a given NIC, the IB specification is not concerned with the operation of the NIC itself and does not suggest any way that the NIC could serve more than one host at a time.

The IB specification also does not say how Ethernet frames (or other types of network packets or datagrams) should be encapsulated in IB communication streams carried over the fabric between the host and the NIC. In the local Windows™ environment, for example, the Network Driver Interface Specification (NDIS) specifies how host communication protocol programs and NIC device drivers should communicate with one another for this purpose. NDIS defines primitives for sending and receiving network data, and for querying and setting configuration parameters and statistics. For connecting hosts to Ethernet NICs over dynamic buses such as the Universal Serial Bus (USB), Bluetooth™ and InfiniBand, Microsoft (Redmond, Wash.) has developed Remote NDIS (RNDIS) as an extension of NDIS. RNDIS is described in detail in the Remote NDIS Specification (Rev. 1.00, January, 2001), which is incorporated herein by reference. It defines a bus-independent message protocol between a host and a remote network interface device over abstract control and data channels.

In the IB environment, the control and data channels are provided by QPs established for this purpose between the HCA of the host and the TCA of the NIC. RNDIS messages are transported over the channels by encapsulating them in IB "send" messages on the assigned QPs. Either reliable or unreliable IB connections between the QPs may be used for this purpose. The RNDIS control and data connections enable the host to send and receive Ethernet frames as though the NIC was connected to the host by its local PCI bus.

SUMMARY OF THE INVENTION

It is an object of some aspects of the present invention to provide devices and methods that enable multiple hosts that are connected to a NIC by a switch fabric to dynamically share the resources of the NIC.

It is a further object of some aspects of the present invention to provide methods and devices enabling multiple hosts to simultaneously share a single port on a LAN served by a NIC.

It is still a further object of some aspects of the present invention to provide mechanisms for managing quality of service (QoS) provided to multiple hosts sharing a NIC.

In preferred embodiments of the present invention, multiple hosts are coupled by a switch fabric to a NIC, enabling the hosts to communicate via the NIC over an external network, typically an Ethernet network. The NIC comprises one or more ports connecting to the network, and each of the hosts that uses the NIC is mapped to one of the ports. Typically, multiple hosts are mapped to the same port and are able to send and receive data through the port simultaneously. The NIC comprises a packing/unpacking unit, which converts the switch fabric messages received from the hosts into data frames for transmission over the network, and vice versa. This unit includes a scheduler, which queues and schedules the messages received from the different hosts for conversion to frames and transmission on the hosts' assigned network ports. Preferably, the scheduler orders the messages for service based on service levels that are assigned to the hosts, or in particular, that are assigned to the respective transport connections used by the hosts to communicate with the NIC. In the InfiniBand context, the transport connections correspond to the queue pairs used to carry the messages between the HCA of the host and the TCA of the NIC.

On the network side, the NIC comprises a media access control (MAC) filter, which it preferably uses to process the destination MAC addresses of both transmitted and received data frames. Each of the hosts that is coupled to the NIC has at least one MAC address that it uses in sending and receiving frames over the network. For each of the network ports of the NIC, the filter comprises a table that stores the MAC addresses and multicast lists of all the hosts that are assigned to the port. The NIC uses the MAC filter to look up the destination MAC addresses of incoming frames received from the network, in order to determine which host or hosts (for multicast data) are to receive the frames. The NIC then decides which transport service instances (i.e., for Infini-Band, which QPs) to use for delivering the frames over the fabric, depending on the destination host and, preferably, other factors, such as a Virtual LAN (VLAN) priority indicated by the frame header, and/or other properties of the frame.

For outgoing frames sent by the hosts for transmission over the network through their assigned NIC ports, the NIC uses the MAC filter to determine whether any of the destination MAC addresses belong to other hosts that are assigned to the same port. In such a case, the NIC loops the frame back internally, to be conveyed to the destination host over the fabric without passing through the network. For destination hosts assigned to other ports of the NIC, however, the frames are transmitted normally over the network. The loop-back mechanism allows legacy applications that are designed for communication over the network to continue to function transparently when the source and destination hosts are both connected to the switch fabric, regardless of whether the source and destination hosts are on the same NIC port or on different ones. Outgoing multicast packets are simultaneously looped back to those destination hosts on the multicast list that are assigned to the same port, and transmitted over the network to the remaining destination hosts.

In some preferred embodiments of the present invention, the NIC comprises performance monitors, typically counters, which track the use of the network ports by each of the hosts. Although performance monitors are known in the NIC art, they typically track performance globally for each port. Since each port of a NIC is conventionally assigned to only a single host, performance monitors in NICs known in the art have no facilities for distinguishing between traffic sent or received by different hosts on the same port. In these preferred embodiments of the present invention, however, the NIC gathers performance statistics individually for each host, based on their individual MAC addresses and monitoring policies set by an operator of the NIC.

The present invention thus provides mechanisms that allow a single NIC, with only a small number of network ports (or even a single network port), to serve a large number of hosts simultaneously in an efficient manner. It allows costly, high-speed network processing resources to be shared among the hosts, while providing priority service where needed and avoiding blocking of one host's traffic by another's. Furthermore, by concentrating all of the hosts' communications with the external network through its ports, the shared NIC can make optimal use of the available network bandwidth (which is typically considerably smaller than the bandwidth used by the hosts within the SAN.) The MAC filtering and internal loop-back mechanisms allow the NIC to make optimal use of both the switch fabric and the external network in carrying traffic from the network to the hosts and from one host to another.

There is therefore provided, in accordance with a preferred embodiment of the present invention, a network interface device, including:

a fabric interface, adapted to exchange messages over a switch fabric with a plurality of host processors, the messages containing data;

a network interface, including one or more ports adapted to be coupled to a network external to the switch fabric; and message processing circuitry, coupled between the fabric interface and the network interface, so as to enable at least first and second host processors among the plurality of the host processors to use a single one of the ports substantially simultaneously so as to transmit and receive frames containing the data over the network.

In a preferred embodiment, the fabric interface includes a target channel adapter, and the messages include data packets, while the network includes an Ethernet network, and the frames include Ethernet frames.

Preferably, each of the host processors is assigned to a respective one of the ports, and transmits and receives the frames over the one of the ports to which it is assigned. Alternatively, at least one of the host processors is assigned to transmit and receive the frames over two or more of the ports simultaneously.

Typically, the messages include outgoing messages sent by the host processors over the switch fabric, and the message processing circuitry is adapted to extract the data from the outgoing messages and to generate the frames containing the extracted data for transmission over the network. Preferably, the message processing circuitry is adapted to assign respective service levels to the host processors, and to determine an order of processing the outgoing messages responsive to the service levels. Most preferably, the fabric interface is adapted to exchange the messages with the host processors over respective transport connections between the host processors and the fabric interface, and the message processing circuitry is adapted to assign each of the transport connections to a respective one of the service levels. Additionally or alternatively, the message processing circuitry includes a plurality of scheduling queues having respective processing priorities, and is adapted to place each of the outgoing messages in a respective one of the scheduling queues responsive to the service levels assigned to the host processors that sent the messages.

Further additionally or alternatively, each of the host processors is assigned to a respective one of the ports of the network interface, and the message processing circuitry includes one or more scheduling queues for each of the one or more ports, and is adapted to place the outgoing messages in the scheduling queues depending on the respective ports to which the host processors that sent the messages are assigned.

In a preferred embodiment, the message processing circuitry is adapted to determine whether any of the frames generated for transmission over the network in response to one of the outgoing messages from the first host processor are destined to be received by the second host processor and, if so, to loop the data in the frames destined to be received by the second host processor back to the fabric interface, to be conveyed over the switch fabric to the second host processor without being transmitted over the network. Preferably, the message processing circuitry includes a destination address filter for each of the ports, which filter is adapted to process destination addresses of the frames generated for transmission over the network so as to determine whether any of the frames are destined to be received by any of the host processors, including the second host processor, Typically, the frames for transmission over the network comprise a multicast frame, which is destined to be received by both a remote recipient on the network and by the second host processor, and the message processing circuitry is adapted both to generate the multicast frame for transmission over the network to the remote recipient and to loop the data in the multicast frame back to be conveyed to the second host processor. Preferably, the message processing circuitry is controllable so that the data in the multicast frame are looped back to the second host processor, while the transmission of the multicast frame over the network is blocked.

Typically, the messages include incoming messages sent from the fabric interface to the host processors, and the message processing circuitry is adapted to extract the data from the frames received over the network and to generate the incoming messages containing the extracted data to be sent to the host processors. Preferably, the message processing circuitry includes a destination address filter, which is adapted to process destination addresses of the frames received over the network so as to indicate which of the host processors should receive the incoming messages over the switch fabric. Most preferably, the fabric interface is adapted to exchange the messages with the host processors over respective transport connections between the host processors and the fabric interface, and the message processing circuitry is adapted to determine the transport connections over which to send the incoming messages to the host processors indicated by the destination address filter.

In a preferred embodiment, the destination addresses processed by the destination address filter include at least one of a Media Access Control (MAC) address and a Virtual Local Area Network (VLAN) tag.

Preferably, when the frames received over the network include a multicast frame, the destination address filter is adapted to indicate that one or more of the hosts should receive the incoming messages containing the data extracted from the multicast frame.

Typically, the messages further include outgoing messages sent by the host processors over the switch fabric, and the message processing circuitry is adapted to extract the data from the outgoing messages and to generate the frames containing the data extracted from the outgoing messages for transmission over the network, and the destination address filter is adapted to process the destination addresses of the generated frames so as to determine whether any of the frames are destined to be received by any of the host processors and, if so, to loop the data in the frames back to the fabric interface, to be conveyed over the switch fabric to the host processors that are destined to receive them.

Preferably, the message processing circuitry is adapted to extract the data from two or more of the frames received over the network and destined for a given one of the host processors, and to generate one of the incoming messages containing the data extracted from the two or more of the frames.

In a preferred embodiment, the message processing circuitry includes a plurality of counters, which are adapted to collect performance statistics individually for each of the first and second host processors regarding the frames transmitted and received using the single one of the ports.

There is also provided, in accordance with a preferred embodiment of the present invention, a method for interfacing a plurality of host processors to a network, including:

providing a network interface device having one or more ports connected to a network;

coupling the host processors to exchange messages containing data over a switch fabric with the network interface device, such that at least first and second host processors among the plurality of the host processors are assigned to use a single one of the ports of the network interface device; and processing the messages exchanged with the host processors so as to enable the first and second host processors to use the single one of the ports substantially simultaneously to transmit and receive frames containing the data over the network.

There is additionally provided, in accordance with a preferred embodiment of the present invention a network interface device, including:

a fabric interface, adapted to exchange messages over a switch fabric with a plurality of host processors, including first and second host processors, the messages containing data and including outgoing messages sent by the host processors over the switch fabric;

a network interface, adapted to be coupled to a network external to the switch fabric; and message processing circuitry, coupled between the fabric interface and the network interface, and adapted to extract the data from the outgoing messages and to generate frames containing the extracted data for transmission over the network via the network interface, and further adapted to determine whether any of the frames generated in response to one of the outgoing messages from the first host processor are destined to be received by the second host processor and, if so, to loop the data in the frames destined to be received by the second host processor back to the fabric interface, to be conveyed over the switch fabric to the second host processor without being transmitted over the network.

There is further provided, in accordance with a preferred embodiment of the present invention, a network interface device, including:

a fabric interface, adapted to exchange messages over a switch fabric with a plurality of host processors, the messages containing data;

a network interface, adapted to be coupled to a network external to the switch fabric; and message processing circuitry, coupled between the fabric interface and the network interface, so as to enable at least first and second host processors among the plurality of the host processors to transmit and receive frames containing the data over the network via the network interface, the message processing circuitry including a plurality of counters, which are adapted to collect performance statistics individually for each of the first and second host processors regarding the frames transmitted and received via the network interface.

There is moreover provided, in accordance with a preferred embodiment of the present invention, a method for interfacing a plurality of host processors to a network, including:

connecting a network interface device to a network;

coupling the host processors, including at least first and second host processors among the plurality of the host processors, to exchange messages containing data over a switch fabric with the network interface device, the messages including outgoing messages sent by the host processors over the switch fabric;

processing the messages so as to extract the data from the outgoing messages and to generate frames containing the extracted data for transmission over the network via the network interface device; and determining whether any of the frames generated for transmission over the network in response to one of the outgoing messages from the first host processor are destined to be received by the second host processor and, if so, looping the data in the frames destined to be received by the second host processor back to the fabric interface, to be conveyed over the switch fabric to the second host processor without being transmitted over the network.

There is furthermore provided, in accordance with a preferred embodiment of the present invention, a method for interfacing a plurality of host processors to a network, including:

connecting a network interface device to a network;

coupling the host processors to exchange messages containing data over a switch fabric with the network interface device;

processing the messages exchanged with the host processors so as to enable the first and second host processors to transmit and receive frames containing the data over the network via the network interface device; and collecting performance statistics at the network interface device individually for each of the first and second host processors regarding the frames transmitted and received via the network interface device.

The present invention will be more fully understood from the following detailed description of the preferred embodiments thereof, taken together with the drawings in which:

BRIEF DESCRIPTION OF THE DRAWINGS

FIG. 10 is a block diagram that schematically shows details of a network receiving unit for receiving incoming frames from a network, in accordance with a preferred embodiment of the present invention.

DETAILED DESCRIPTION OF PREFERRED EMBODIMENTS

Figure 1:
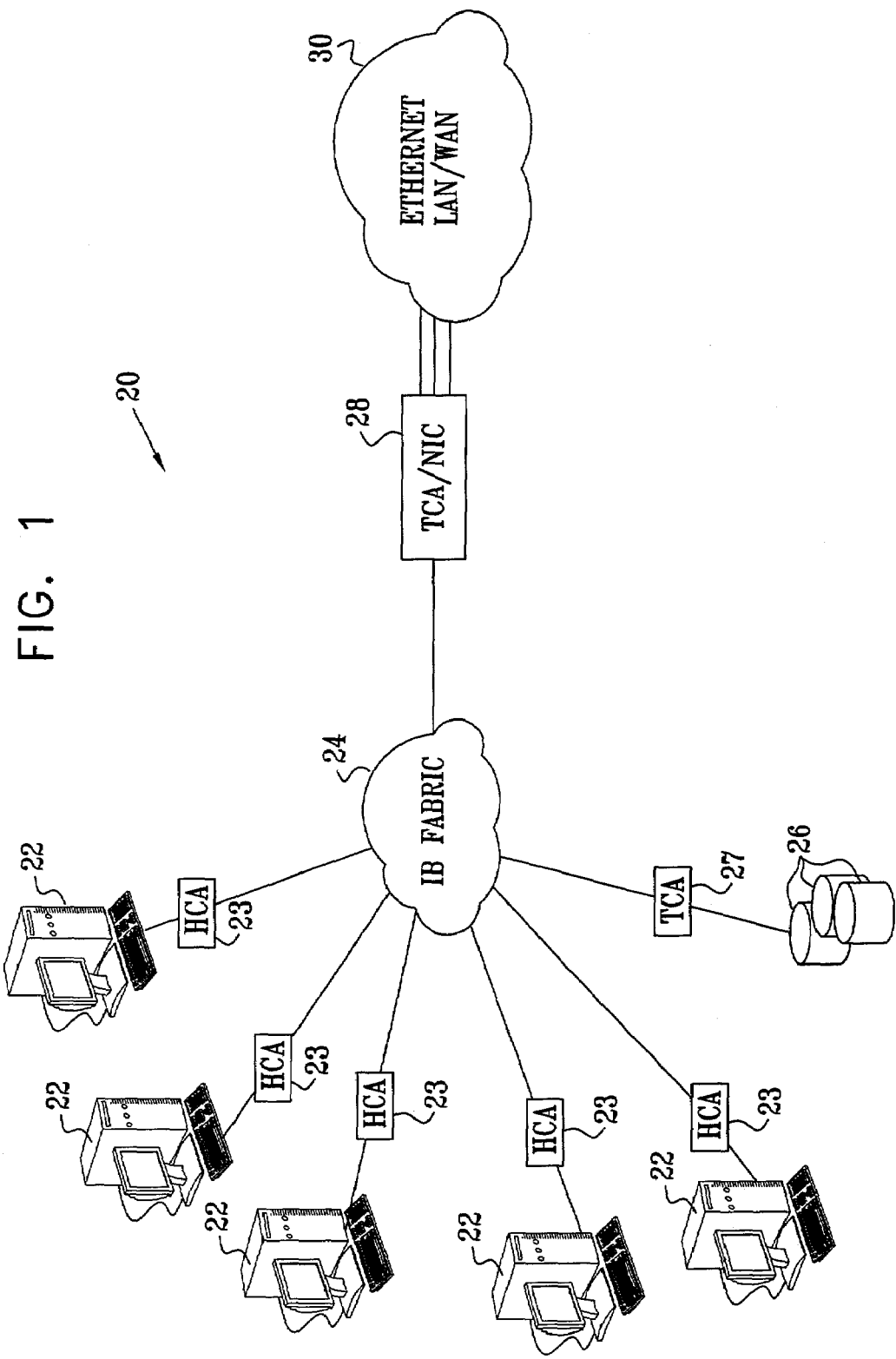
FIG. 1 is a block diagram that schematically illustrates a system for connecting multiple hosts to a network via a switch fabric and a shared network interface card (NIC), in accordance with a preferred embodiment of the present invention.

FIG. 1 is a block diagram that schematically illustrates a system 20 for connecting hosts 22 via a switch fabric 24 to an external network 30, in accordance with a preferred embodiment of the present invention. Fabric 24 preferably comprises an InfiniBand (IB) fabric, and hosts 22 are connected to the fabric via suitable host channel adapters (HCAs) 23, as described in the above-mentioned IB specification. Fabric 24 enables hosts 22 to access various sorts of shared resources, such as shared storage 26, and a network I/O unit 28 linking the hosts to network 30. The I/O unit comprises a target channel adapter (TCA) for communicating over fabric 24 and a network interface card (NIC) for interfacing with network 30. Since the essential function of the I/O unit is to couple hosts 22 to network 30, it is referred to hereinafter simply as NIC 28. Storage 26 is likewise linked to fabric 24 by another TCA 27.

Typically, network 30 comprises an Ethernet LAN, preferably operating in accordance with Gigabit Ethernet (GbE) standards, as are known in the art, such as IEEE standard 802.3. NIC 28 has one or more ports on network 30, preferably four such ports, which are shared by hosts 22. Most preferably, each host is assigned, or mapped, to one of the network ports. Multiple hosts are typically assigned to the same port, as described hereinbelow. The configuration of FIG. 1 is shown by way of example, however, and other types and configurations of networks and switch fabrics may similarly be used for this purpose. The necessary changes in NIC 28 will be apparent to those skilled in the art, based on the description of the NIC provided hereinbelow.

Figure 2:
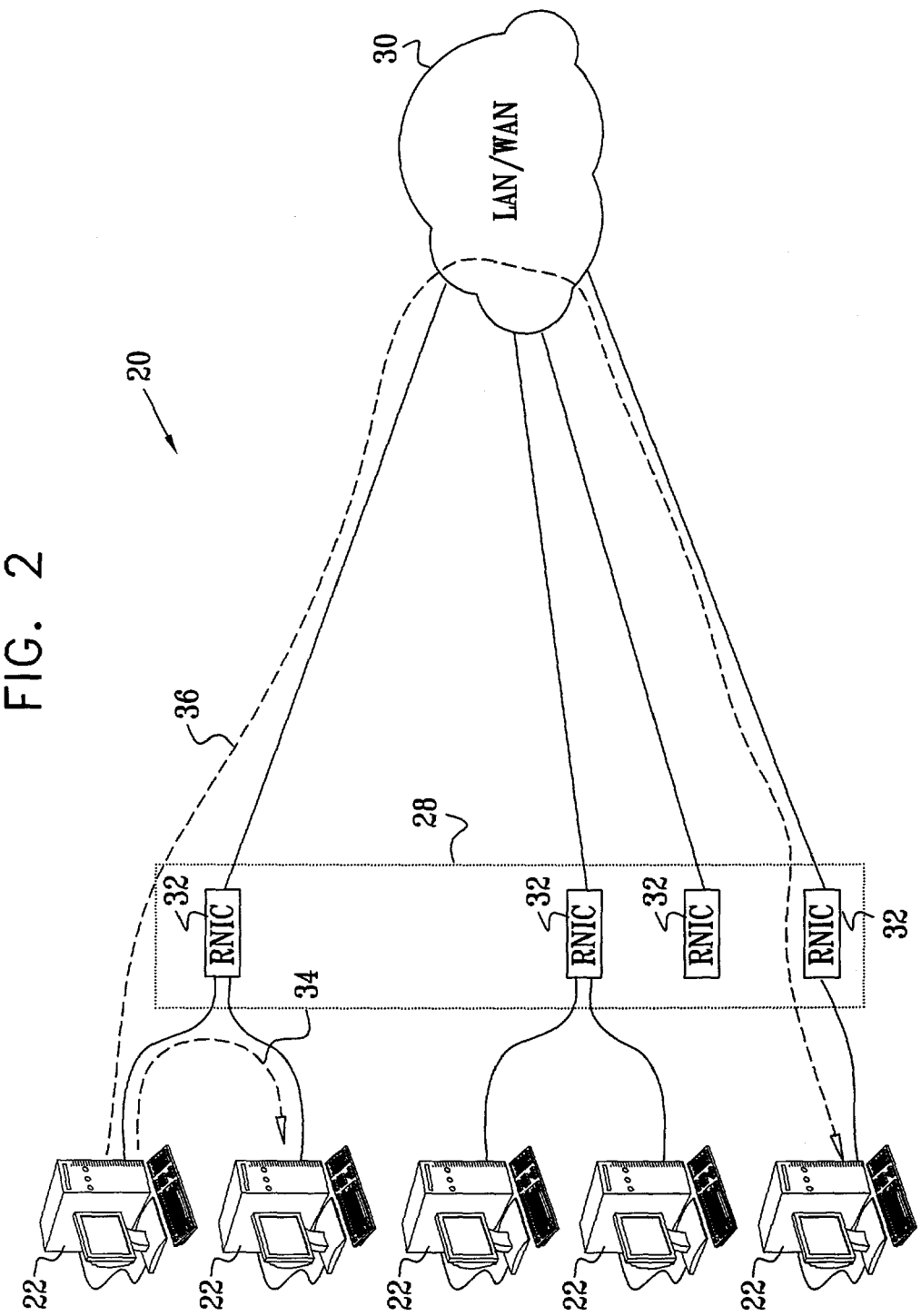
FIG. 2 is a block diagram that schematically illustrates a logical topology and data routes in the system of FIG. 1, in accordance with a preferred embodiment of the present invention.

FIG. 2 is a block diagram that schematically illustrates the logical topology of system 20, in accordance with a preferred embodiment of the present invention. From the point of view of network 30, each port of NIC 28 logically appears to belong to a separate remote NIC (RNIC) 32, as shown in the figure, or even to a switch. Each RNIC 32 has one or more Ethernet MAC addresses, which correspond to the MAC addresses of the hosts that are assigned to the port. (From the point of view of fabric 24, on the other hand, NIC 28 appears as a single TCA with an I/O unit that includes multiple I/O controllers, and whose physical processing resources are preferably shared among all the hosts, regardless of the port assignments.)

Hosts 22 are not generally aware that they may be sharing their RNIC 32 with other hosts. When an application process on one of hosts 22 wishes to send an Ethernet frame to another one of the hosts, it simply dispatches the frame (encapsulated in an IB send message) to its assigned RNIC, specifying the appropriate destination address. The hosts follow the same protocols for sending frames regardless of whether the destination address belongs to one of hosts 22 in system 20 or to a remote host (not shown) on the other side of network 30. Upon receiving an outgoing frame from one of hosts 22, RNIC 32 checks the destination MAC address (unicast or multicast) to determine whether any of the hosts to which the frame is addressed are assigned to the same port and are thus served by the same RNIC 32. If so, the RNIC loops the frame back through fabric 24 to the destination host, as shown by a loop-back path 34. On the other hand, frames addressed to hosts that are assigned to other ports (and thus other RNICs) are transmitted onto network 30, which then switches them back to the appropriate ports, as shown by a network path 36.

Multicast frames generated by one of hosts 22 may be simultaneously transmitted over fabric 24 to remote recipients and looped back to other hosts via fabric 24. If the host that generated such a frame is on the applicable multicast list, RNIC 32 preferably ensures that the frame is not looped back to the generating host. An operator of system 20 may determine that multicasts are to be sent only to hosts 22 on fabric 24, and are to be blocked from transmission out to network 30. In this case, RNIC 32 will only loop the multicast frames back through the fabric.

As a further option, not shown in this figure, a single host 22 may communicate simultaneously over network 30 on multiple links, using two or more RNICs at the same time. This option, known as link aggregation, enables the host to use more network bandwidth than could be offered by a single link. Typically, software running on the host splits outgoing data between the multiple links, and reassembles data that the host receives on the multiple links from the network.

Figure 3:
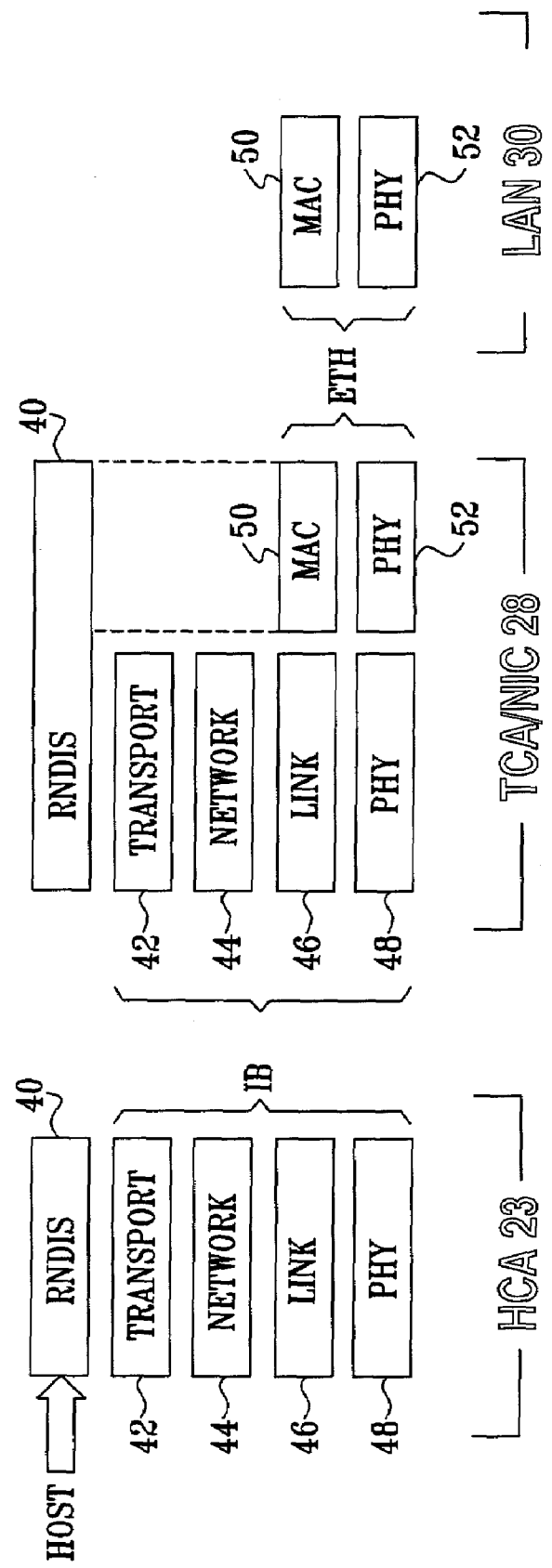
FIG. 3 is a block diagram that schematically illustrates protocol stacks used in communication between each of the hosts and the NIC in the system of FIG. 1.

FIG. 3 is a block diagram that schematically shows protocol stacks used by hosts 22 in communicating over network 30 using NIC 28, in accordance with a preferred embodiment of the present invention. In this example, it is assumed that hosts 22 operate in a Windows environment, and thus use a RNDIS application layer 40 to communicate with NIC 28, as described in the Background of the Invention. The IB Communication Manager (CM) and RNDIS control messages are used to initialize and manage the RNDIS connection between the host and NIC, and RNDIS data messages are then used to pass the contents of Ethernet frames. Similar protocols are available or can be provided by those skilled in the art for use by hosts running other operating systems.

To communicate with NIC 28, host 22 opens at least two queue pairs (QPs) on HCA 23, including at least one QP for RNDIS control messages and one for RNDIS data messages. The host invokes the CM to establish connections with corresponding QPs on the TCA of NIC 28, via an IB transport layer 42. Either reliable or unreliable connections may be used for this purpose. To send RNDIS control and data messages to NIC 28, the host submits work requests (WRs) to send queues of the HCA, causing the HCA to convey IB send packets encapsulating the RNDIS messages using the appropriate QPs. The host also posts WRs to receive queues of the HCA to prepare the HCA to receive IB send packets returned by the TCA. In like fashion, the TCA returns encapsulated RNDIS messages to the HCA. The IB packets are carried over fabric 24 using IB link layer 46 and physical layer 48, as provided by the IB specification. The use of an IB network layer 44 is optional.

Upon receiving IB send packets from host 22, NIC 28 reads the RNDIS messages and uses the data they contain to construct outgoing Ethernet frames. The frames are carried over Ethernet MAC layer 50 and physical layer 52, to destination MAC addresses specified by the Ethernet headers optionally, the frames also include IP network and transport layer (such as TCP or UDP) headers, which are typically created by communication software on host 22. Alternatively or additionally, the network and transport headers may be processed by dedicated processing hardware in NIC 28.

Figure 4:
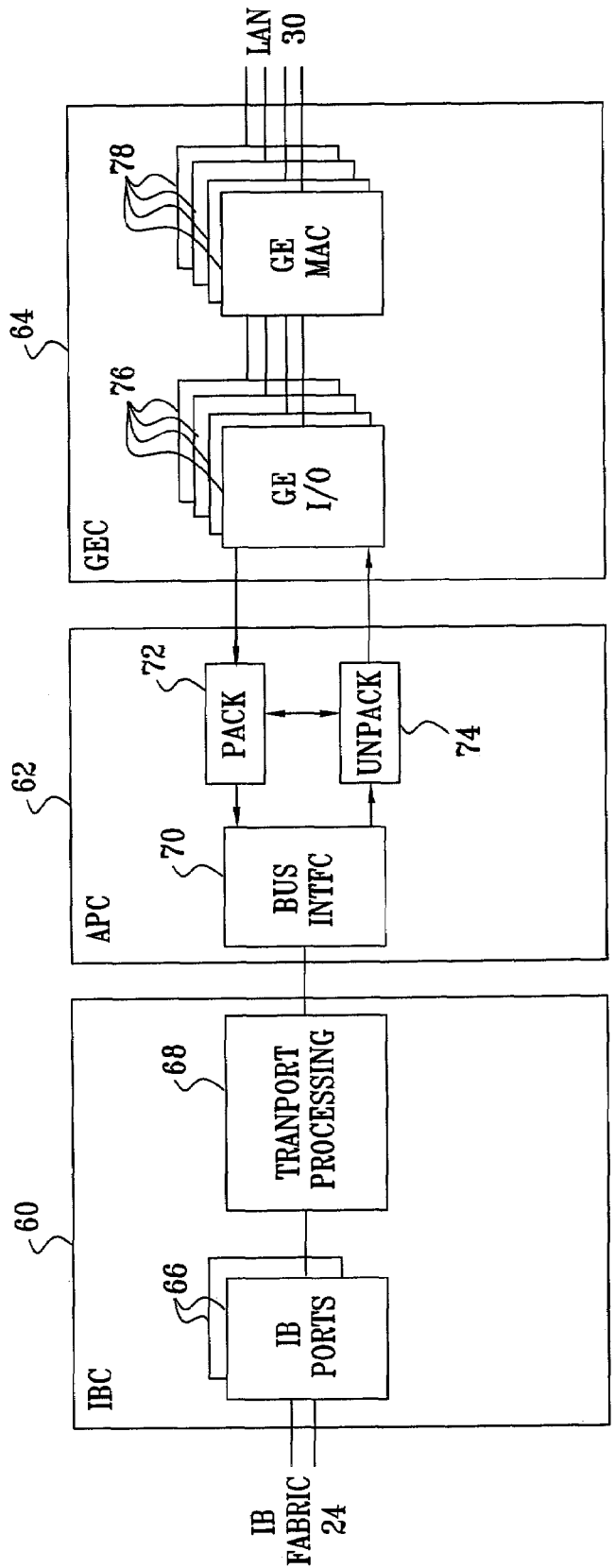
FIG. 4 is a block diagram that schematically illustrates functional elements of a NIC, in accordance with a preferred embodiment of the present invention.

FIG. 4 is a block diagram that schematically shows details of NIC 28, in accordance with a preferred embodiment of the present invention. The NIC comprises three main sections:

- An InfiniBand controller (IBC) 60 performs the functions of the TCA, beginning with sampling and driving IB ports 66, and performing link-layer functions as defined in the IB specification. A transport processing block 68 carries out transport checks and IB packet and message manipulations, as provided in the IB specification. Block 68 is capable of sending and receiving IB messages on multiple queue pairs (QPs), with at least two QPs opened for each host 22 using the NIC. Further aspects of the operation of IBC 60, and particularly of transport processing block 68, are described in a U.S. patent application entitled, "Network Interface Adapter with Shared Data Send Resources," filed Dec. 4, 2001, which is assigned to the assignee of the present patent application and whose disclosure is incorporated herein by reference. Although this application describes a HCA, the requisite elements of the HCA can be adapted in a straightforward manner for use as a TCA in IBC 60.

- An application part controller (APC) 62 translates between IB messages on the side of fabric 24 and Ethernet frames on the side of network 30. A bus interface 70 links the TCA processing functions of IBC 60 to the RNDIS/Ethernet processing functions of APC 62. An incoming packing unit 72 converts incoming Ethernet frames to IB messages, while an outgoing unpacking unit 74 converts outgoing IB messages to Ethernet frames. Packing unit 72 and unpacking unit 74 are described in detail hereinbelow. A "backdoor" between the unpacking and packing units is used by APC 62 to respond to application messages, such as RNDIS control messages, that are sent over fabric 24. Typically these application messages are used to configure the NIC and receive status information and statistics.

- A Gigabit Ethernet controller (GEC) 64 serves as the interface to network 30. For each of the Ethernet ports provided by NIC 28, GEC 64 comprises a Gigabit Ethernet I/O (GEIO) unit 76 and a Gigabit Ethernet MAC (GE MAC) unit 78. MAC unit 78 provides Ethernet physical layer and MAC layer protocol support, as is known in the art. GEIO performs additional functions used to support multiple hosts 22 on a single port of GEC 64, such as performance monitoring and internal loop-back of frames addressed to other hosts on the same port. These functions are described in detail hereinbelow.

APC 62 and/or GEC 64 may also be configured to take on other frame and packet processing operations, such as checksum calculation.

Figure 5:
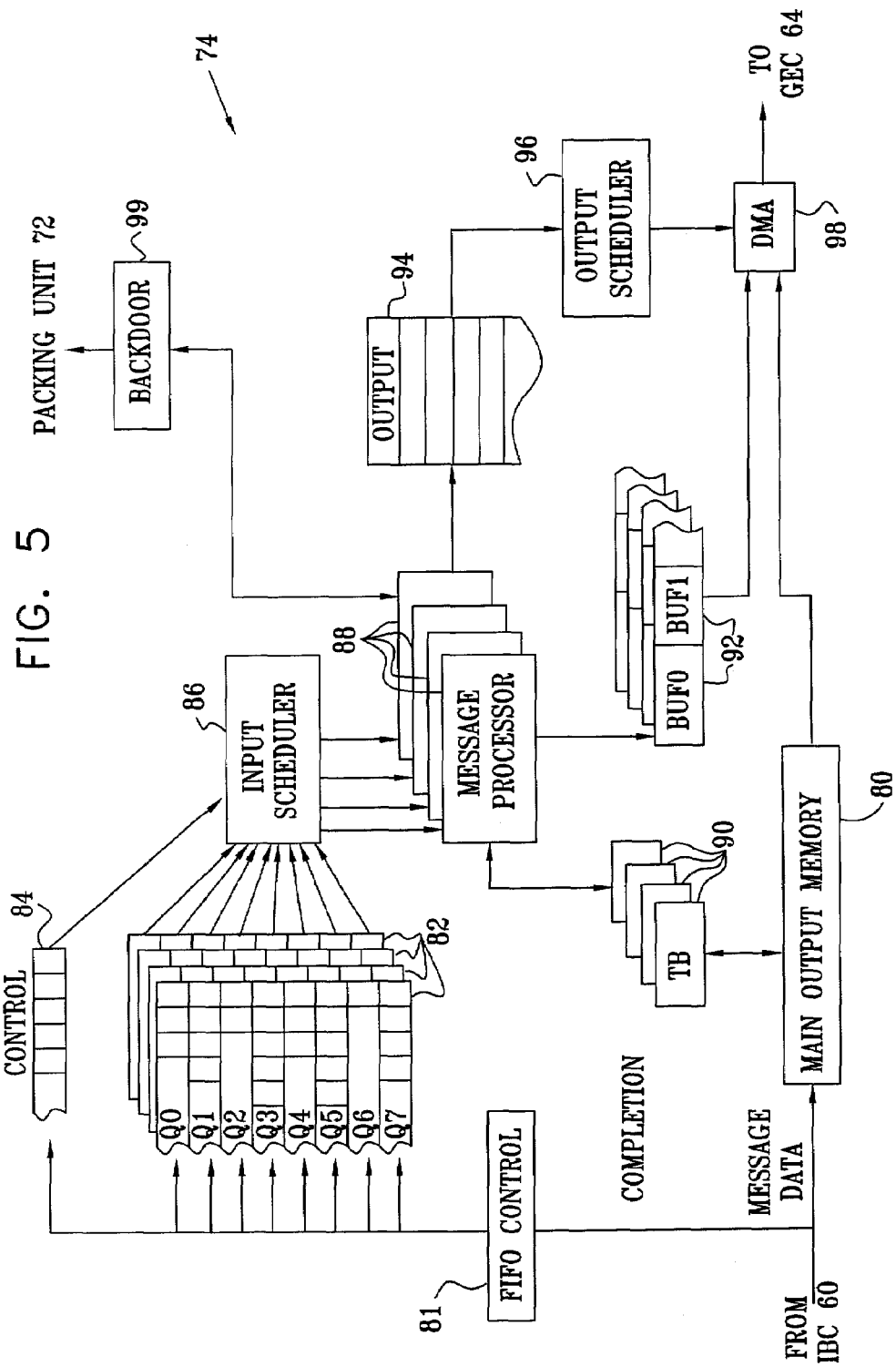
FIG. 5 is a block diagram that schematically illustrates an unpacking unit used to generate outgoing data frames, in accordance with a preferred embodiment of the present invention.

FIG. 5 is a block diagram that schematically shows details of unpacking unit 74, in accordance with a preferred embodiment of the present invention. When one of hosts 22 prepares one or more Ethernet frames (typically in the form of a RNDIS data message with RNDIS headers accompanying the Ethernet frames) to pass to NIC 28 for transmission, its HCA 23 encapsulates the RNDIS message in an IB send message, as noted above. The HCA may break the send message up into multiple IB packets, as is required by the IB specification when the message size exceeds the path MTU. When one of these IB send packets is received by one of ports 66, the port and transport processing block 68 analyze the packet for correctness and to determine the destination QP of the packet. Block 68 obtains a scatter descriptor from unpacking unit 74, telling it where to write the contents of the packet in a main output memory 80. Block 68 strips the packet of its IB headers and stores the payload in the designated location in memory 80. The payload typically includes both the actual data to be transmitted in the outgoing Ethernet frame (or frames) and the RNDIS header. If the IB send message was broken up into multiple send packets at HCA 23, the payload is reassembled from the multiple packets in memory 80.

Transport processing block 68 maintains context information for each QP, which it uses to track the packet serial numbers (PSNs) of the incoming packets and to determine when all of the packets in a given IB message have arrived and their payloads have been transferred to memory. When the transport processing block 68 has completed receiving and processing an IB message, it sends a completion event to a FIFO controller 81 in unpacking unit 74, along with a message descriptor indicating the location of the payload of the IB message in memory 80. Controller 81 enters the descriptor in a scheduling queue 82. Preferably, the unpacking unit maintains multiple scheduling queues with different levels of service. In the example shown in FIG. 5, there are eight queues, from Q0 with the highest service level, down to Q7 with the lowest. Most preferably, there is a separate queue structure, with its own hierarchy of service levels, for each of the output ports of GEC 64. The use of a separate queue structure for each of the network ports is useful in avoiding blocking of one port by heavy traffic on another of the ports.

Controller 81 determines the queue in which to place each event (which port and which service level) depending on the QP on which the IB send message was received. The QP corresponds uniquely to one of hosts 22, and this correspondence determines the port to which the message is assigned. A given host may use multiple QPs, with different service levels assigned to the different QPs. Preferably, the SL attributes of the QPs are correlated with the service levels of scheduling queues 82 to which the QPs are assigned. Most preferably, a separate control queue 84 is provided for control messages, which NIC 28 is not allowed to discard, unlike the data messages that are entered in queues 82. The control messages are also received by IBC 60 on different QPs from the data messages.

An input scheduler 86 demultiplexes the control and data messages from queues 84 and 82 to a bank of message processors 88, in accordance with the priorities of the different service levels of the queues. Each processor 88 preferably comprises a dedicated RISC processor, which is programmed in firmware to convert the RNDIS data messages to Ethernet frames. For each message, processor 88 receives the message descriptor from scheduler 86, indicating the location of the message data in memory 80. The processor reads the RNDIS header part of the data from the memory via a translation buffer (TB) 90, which maps the location of the message data in memory 80 (which is not necessarily a physically-contiguous block) to a contiguous address range. Based on the instructions in the RNDIS header, processor 88 prepares frame assembly directions in one of a set of buffers 92. The directions include a direct memory access (DMA) descriptor indicating the data in memory 80 that are to be carried in the header and payload of the frames. Other information, such as checksum data and Virtual LAN (VLAN) tagging, may be included in the directions, as well.

When input scheduler 86 has assigned a message descriptor to one of processors 88, it reserves a job completion entry in an output queue 94. (In this way, the input scheduler assures that the messages will be transmitted in the proper order.) Once processor 88 has finished preparing the frame assembly directions, it writes the completion entry to queue 94, indicating in which buffer 92 the descriptor is located, the number of Ethernet frames to be prepared for this entry, the port to which the frames are to be sent and the VLAN identifier. An output scheduler 96 passes the entries from queue 94 to a DMA engine 98, which then reads the descriptors from buffer 92 and the data from memory 80. The DMA engine thus assembles the Ethernet frames to be transmitted and passes them to GEC 64. Once the DMA engine has completed the frames, the memory resources used for the message in buffer 92, memory 80 and queues 82 are released. Meanwhile, since each processor 88 has multiple buffers 92, the processor can generate the next DMA descriptor in its next buffer while waiting for DMA engine 98 to complete the previous descriptor and free the previous buffer. Although two buffers 92 per processor 88 would be sufficient, a larger number of buffers is desirable to better support the multiple output ports provided by GEC 64.

In addition to generating outgoing frames, message processors 88 also handle and respond to control messages received in control queue 84. After handling such messages, processors 88 write their responses to a backdoor buffer 99. Packing unit 72 reads the contents of the buffer and returns the response via fabric 24 to the sender.

Figure 6:
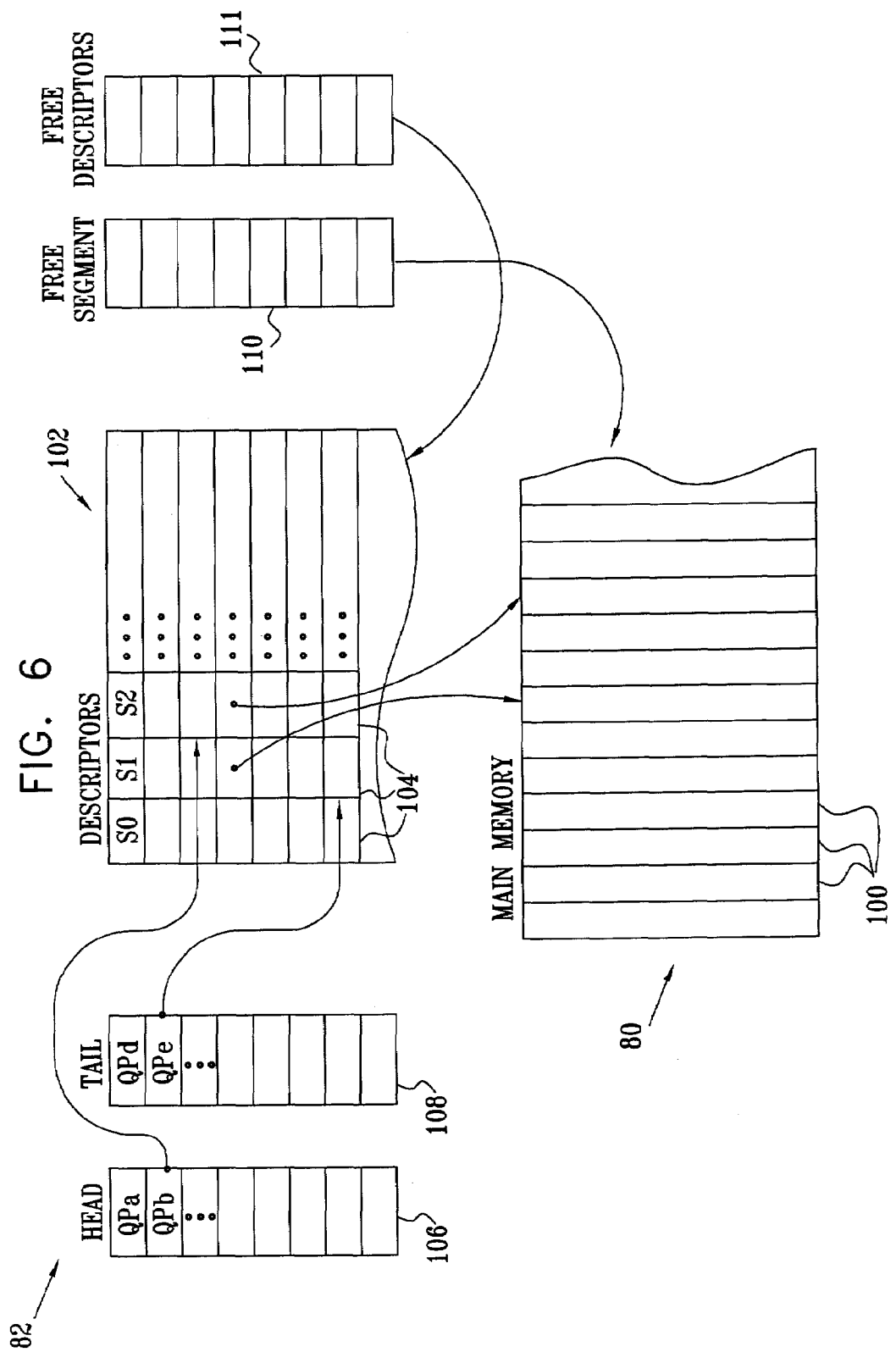
FIG. 6 is a block diagram that schematically shows details of a queue structure used in generating outgoing data frames, in accordance with a preferred embodiment of the present invention.

FIG. 6 is a block diagram that schematically illustrates the structure of scheduling queues 82, in accordance with a preferred embodiment of the present invention. Main memory 80 is divided into segments 100, each preferably 2 kB in size. When transport processing block 68 writes data to memory 80, as described above, it places a message descriptor in a descriptor buffer 102. The message descriptor indicates the QP number and length of the message data and contains pointers to segments 100 in which the message data are stored. (The message descriptor may vary in length, depending on the number of segments that the message consumes, preferably up to five such segments, for a total data length of 10 kB. Typically, 2 kB is sufficient for an Ethernet frame of 1524 bytes along with its RNDIS header, while 10 kB is required to contain a jumbo frame of 9000 bytes with its RNDIS header.)

Buffer 102 is preferably maintained as a linked list, in which each message descriptor includes a "next" field, pointing to the location in buffer 102 of the next descriptor in its scheduling queue. A free segment list 110 indicates which segments 100 are available to be written to in memory 80. A free descriptor list 111 indicates which words 104 in buffer 102 are available to hold message descriptors.

As noted above, scheduling queues 82 are preferably arranged according to different service levels, which are assigned to the QPs on which IBC 60 receives the corresponding IB messages. To access the scheduling queues, FIFO controller 81 and input scheduler 86 maintain a queue head list 106 and a queue tail list 108, containing pointers to the descriptors in buffer 102 that are at the head and tail of each of the queues. When the FIFO controller receives a new descriptor to place in buffer 102, it checks the port and service level assignments of the QP, which determine the scheduling queue to which this descriptor is to be assigned. It then reads the entry for this scheduling queue in tail list 108, to identify the last descriptor currently in the queue. It updates the "next" field in this last descriptor so that it points to the new descriptor being entered in the queue. It then updates the tail list entry to point to the new descriptor. The first time an entry is placed in a given queue, the head and tail values are both set to point to this new entry.

To read entries from queues 82, input scheduler 86 refers to head list 106 to find the next descriptor to read out of descriptor buffer 102. It then reads the "next" field of this descriptor to determine the following descriptor in the list, and updates the head list entry to point to the following descriptor. When the last entry has been read out of a given queue, the head and tail values are both set to null values.

Figure 7:
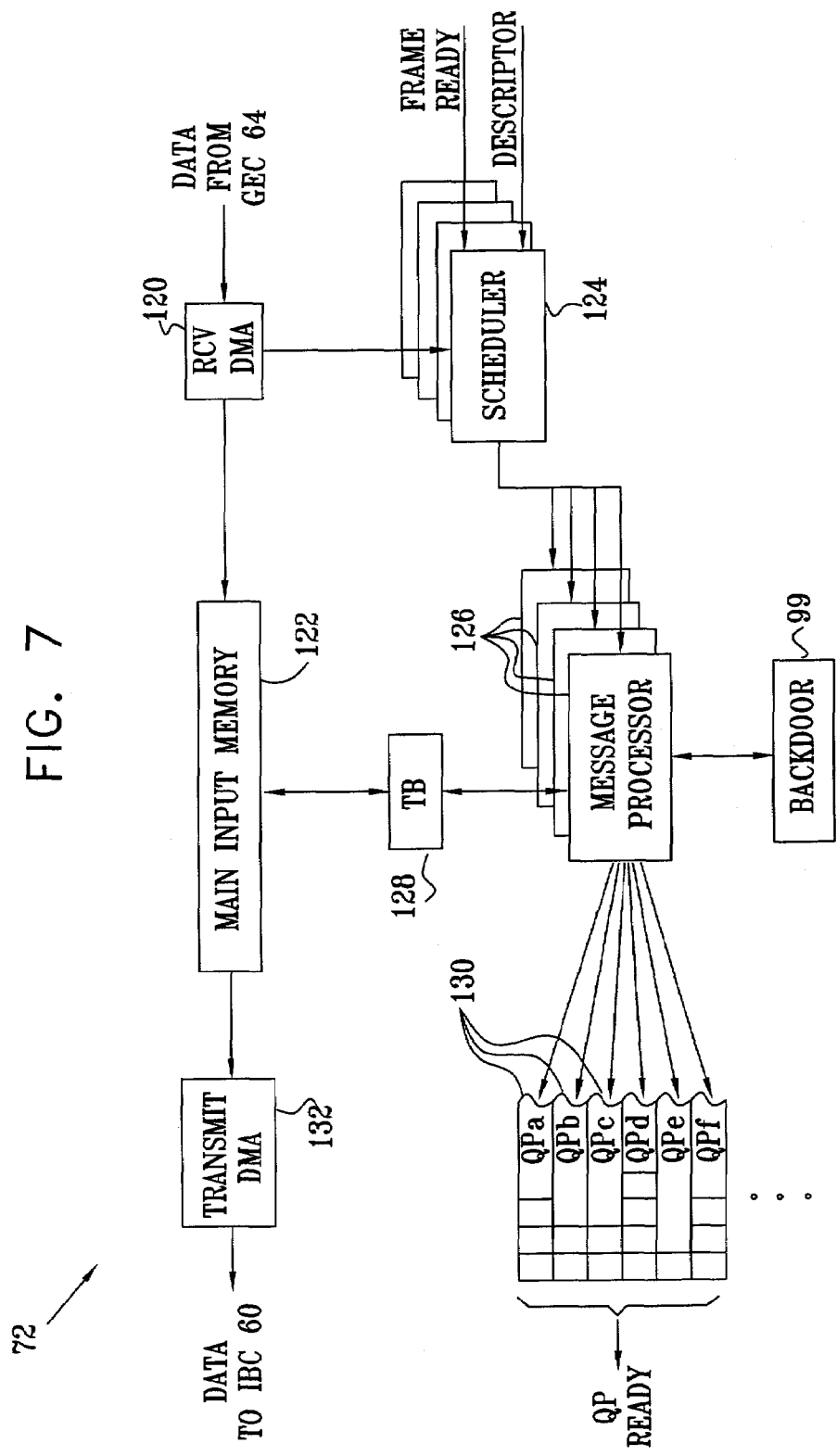
FIG. 7 is a block diagram that schematically illustrates a packing unit used to process incoming data frames, in accordance with a preferred embodiment of the present invention.

FIG. 7 is a block diagram showing details of packing unit 72, in accordance with a preferred embodiment of the present invention. When GEIO 76 has received a complete incoming frame, it writes the frame (header and payload data) into a receive FIFO (shown in FIG. 10) and signals unit 72 to indicate that the frame is ready. The frame may be an incoming frame received from network 30, or it may be a frame generated by one of hosts 22 and looped back by GEIO 76. The GEIO generates a frame descriptor, which indicates which host 22 or hosts are to receive this frame, as determined by GEIO 76 based on the destination MAC address of the frame. The MAC filtering function used to determine the host identities and the loop-back function performed by the GEIO are described in greater detail hereinbelow.

When GRIO 76 has finished preparing the descriptor, it passes a "frame ready" indication, to an input scheduler 124. Preferably, a bank of schedulers 124 is provided, most preferably one scheduler per input port of GEC 64, with an input arbitration mechanism, to avoid processing bottlenecks at this stage. Scheduler 124 is responsible for determining the QP (or QPs) on which IBC 60 will send the frame contents to the appropriate host (or hosts). For this purpose, the scheduler reads the host identity from the descriptor and, if necessary, reads parts of the corresponding frame from the FIFO buffer of GEIO 76. The QP assignment depends on the host MAC address and priority, and may be further resolved depending on the frame protocol headers and other frame contents. In this manner, for example, it is possible to associate different TCP connections used by a single host on network 30 with corresponding QPs connected to that host.

Once scheduler 124 has finished resolving the QP number for each frame, it passes the frame descriptor and the QP number to one of a bank of message processors 126. The scheduler preferably keeps track of the processing of messages by processors 126 in order to ensure that all messages on any given QP are processed and transmitted in order and that processors 124 do not overwrite one another's data. The assigned processor 126 signals a receive DMA engine 120 to read the frame from the GEIO receive FIFO into a main input memory 122. Multicast frames are replicated in memory 122 and are handled separately for each QP on which the corresponding IB messages are to be transmitted. The location of each frame in memory 122 is indicated by the frame descriptor, pointing to the segments in memory 122 where the frame now resides, in a similar manner to the descriptors in buffer 102 described above.

Using the frame descriptor, the assigned message processor reads the frame header from the data in memory 122, preferably via a translation buffer (TB) 128. The message processor then uses the header information to construct a RNDIS data message header. Preferably, processor 126 writes the header that it has constructed to memory 122 together with the data read in by DMA 120. The processor then constructs a message descriptor indicating the length of the segments in memory 122 that contain the RNDIS message header and data. Once a complete message descriptor has been prepared, and the message header and data are ready in memory 122, processor 126 places the descriptor in a queue 130 assigned to the designated QP.

It is generally preferably that the data from multiple frames received from network 30 for a given host be aggregated in a single IB send message from NIC 26 to the host on the appropriate QP. Aggregation of frames into longer IB messages tends to reduce the pressure on IBC 60 and on fabric 24, as well as reducing the number of interrupts that must be asserted at the receiving host, thus saving on host overhead, as well. Therefore, in constructing the RNDIS data messages, processor 126 preferably combines together several frames received in sequence, until it approaches a preset maximum IB message size. The message processor closes the message descriptor and writes it to queue 130 only when the next frame for this QP would put the IB message over the predetermined size limit, or when a time limit has elapsed, or when multiple message processors are working on the same QP (in order to avoid message misordering).

Each of queues 130 is maintained as a linked list. When a new descriptor is written to the list, packing unit 72 notifies IBC 60 that there is an IB work request waiting for service by "ringing a doorbell" in the IBC via bus interface 70. The use of such doorbells in switch fabric channel adapters is described in the above-mentioned U.S. patent application. The bus interface translates the transport addresses provided by the descriptors into real indices to memory 122. The doorbell indicates to transport processing block 68 that this QP is ready for service. Accordingly, block 68 reads the descriptors from the linked list, and instructs a transmit DMA engine 132 to read the message data out of memory 122. It then places the RNDIS message header and data in one or more IB send packets, adds the required IB headers, and places the packets on the appropriate send queue for transmission via port 66 to the destination host.

Figure 8:
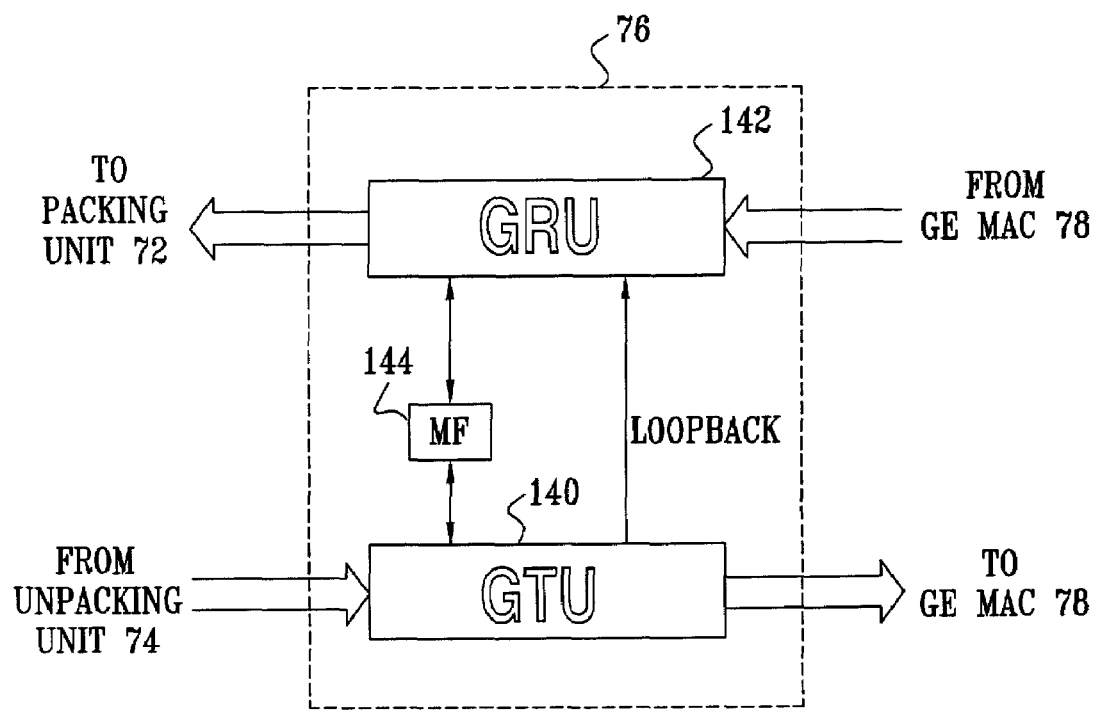
FIG. 8 is a block diagram that schematically illustrates a network I/O unit, in accordance with a preferred embodiment of the present invention.

FIG. 8 is a block diagram that schematically shows details of GEIO 76, in accordance with a preferred embodiment of the present invention. As noted above, GEC 64 preferably contains one GEIO of this sort, plus one GE MAC 78, for each network port of NIC 28. A GE transmit unit (GTU) 140 receives outgoing frames prepared by unpacking unit 74, processes them and passes them on to GE MAC 78 for transmission over network 30 or loop-back to fabric 24. A GE receive unit (GRU) 142 receives incoming frames from GE MAC 78, processes them to determine the hosts to which they should be sent, and passes them to packing unit 72 for processing. In addition to processing the MAC addresses of incoming and outgoing frames, GTU 140 and GRU 142 are also capable of reading and processing (adding or stripping) Virtual LAN (VLAN) identifiers and priorities that are optionally used in Ethernet frame headers.

To process MAC and VLAN destination addresses of incoming and outgoing frames, GTU 140 and GRU 142 refer to a MAC filter 144. The MAC filter comprises look-up tables indexed by the MAC and VLAN addresses. The tables are preferably stored in content-addressable memory (CAM). Alternatively, the tables may be managed as an associative cache with a state machine controller, or using other means known in the art. The number of rows in the MAC and VLAN tables are equal to the number of different hosts and VLANs supported by NIC 28 for unicast transmission, plus additional rows for multicast addresses. Each entry in the tables contains a bit map with one bit per host. For each MAC address and VLAN tag, the bits of the bit map are set to indicate the hosts that are to receive frames arriving with this address or tag. Typically, for unicast addresses, only one bit is set in the table. For multicast and broadcast MAC addresses, however, multiple bits or all of the bits in the bitmap may be set. The table entries preferably comprise a multicast bit and a broadcast bit, corresponding to the multicast and broadcast bits in such MAC addresses.

When the GTU or GRU processes an Ethernet frame, it sends the initial part of the frame, typically the first 16 bytes, which contains the Ethernet header, to MAC filter 144. The MAC filter refers to its tables to look up the MAC destination address and VLAN tag in the frame header. If either the MAC or VLAN does not appear in the table, or appears with an entry of all zeroes (indicating an invalid address), the MAC filter returns a vector of zeroes to the GTU or GRU. Otherwise, assuming that both the destination MAC address and VLAN (if present in the header) are found in the tables, the MAC filter returns a vector which is the bitwise conjunction (AND) of the MAC and VLAN table entries. Alternatively, the MAC filter may return a separate MAC vector and VLAN vector to the GTU or GRU. This vector indicates which of hosts 22 are to receive the frame. Preferably, the VLAN priority field is also extracted from the VLAN tag in the frame header and is used by scheduler 124 of packing unit 72 in determining the QP to use for sending the frame to the destination host. It is possible for multiple VLAN priority levels to use the same QP. Additional vector bits are preferably provided to configure default behavior when the VLAN is not present, to disable VLAN lookup, and for other purposes that may be required.

Figure 9:
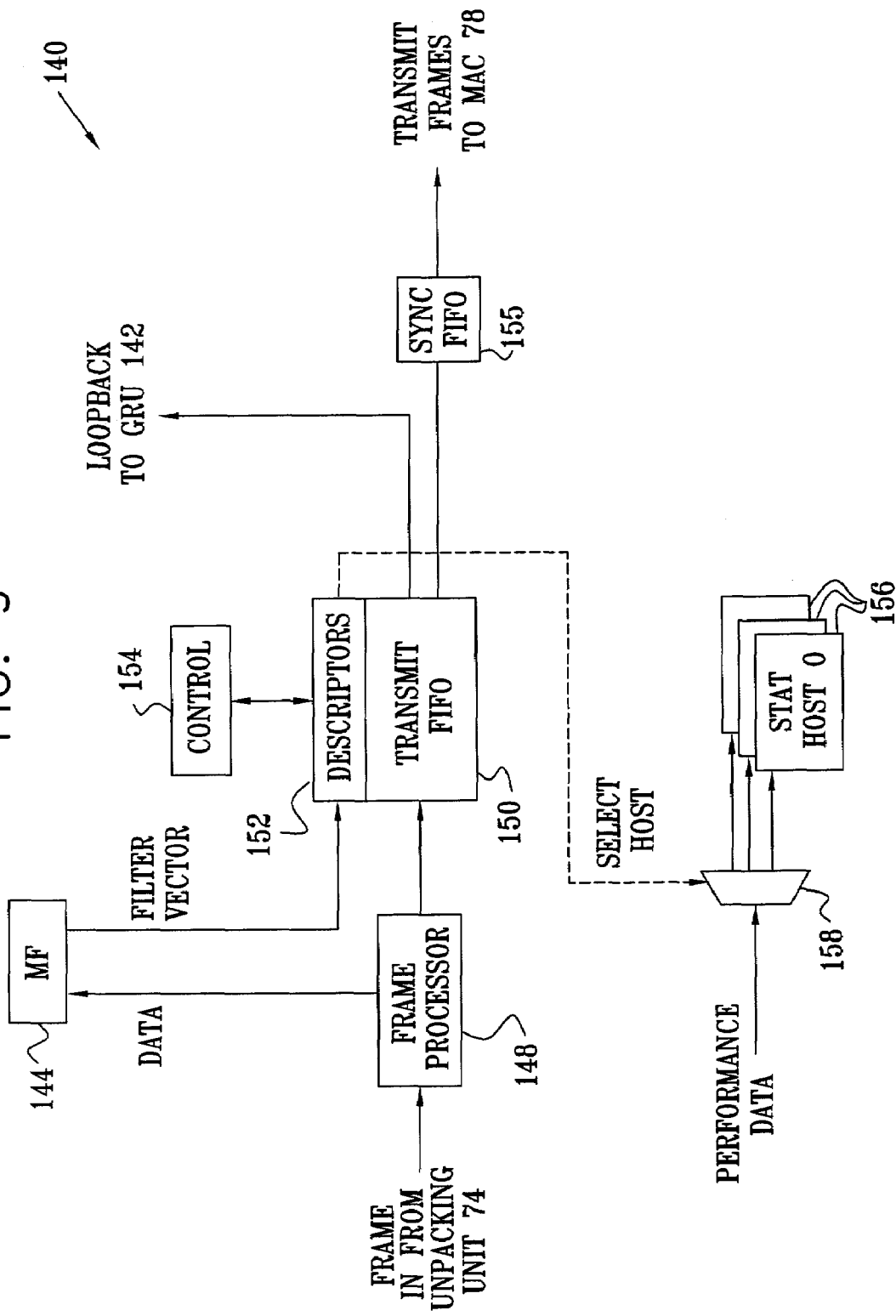
FIG. 9 is a block diagram that schematically shows details of a network transmission unit for transmitting outgoing frames onto a network, in accordance with a preferred embodiment of the present invention.

FIG. 9 is a block diagram that schematically shows details of GTU 140, in accordance with a preferred embodiment of the present invention. A frame processor 148 receives frames from unpacking unit 74 and passes the initial bytes of each frame to MAC filter 144, as described above. The frame processor may also insert a VLAN tag in the frames if so instructed by the unpacking unit. Preferably, the RNDIS header includes an index to the VLAN table of the MAC filter for this purpose (although a modification to the header structure defined in the above-mentioned RNDIS specification would be needed to implement this function). When a frame is ready for transmission, the frame processor places it in a transmit FIFO buffer 150, which is managed by a controller 154 using a list of descriptors 152. A small synchronization FIFO 155 is preferably provided for the purpose of frequency adaptation between GTU 140 and GE MAC 78.

For each frame in buffer 150, descriptor 152 contains the filtering vector that was generated by MAC filter 144 for the frame. If the vector contains all zeroes, controller 154 simply sends the frame out to GE MAC 78 for transmission on network 30. On the other hand, if any of the bits in the filtering vector are set, it means that one or more of the addressees of this frame are hosts 22 on fabric 24. In this case, the frame is looped back to GRU 142, in addition to or instead of being sent out to network 30. Each looped-back frame is preferably accompanied by its MAC filter vector in order to avoid having to repeat the lookup operation in the GRU. The source host, which sent the frame to NIC 28, is excluded from receiving the looped-back frame. Preferably, the filtering vector includes a bit used to indicate that the frame is to be sent out to the network, as well as looped back. In order to allow loop-back and transmission of frames over network 30 to proceed asynchronously, controller 154 preferably maintains two head-of-queue pointers to the list of descriptors 152, one for frames to be looped back and the other for frames to be sent over the network.

Preferably, GTU 140 comprises performance counters 156, which collect performance statistics regarding the frames transmitted by NIC 28. A counter 156 (or a set of counters) is maintained for each host 22 that uses the NIC. Global counters for each port are typically provided by GE MAC 78, but may also be provided in GTU 140. When a performance count is generated, due to a frame being transmitted by GTU 140, for example, a demultiplexer 158 directs the count to the appropriate counter 156, depending on a host select input received by the demultiplexer. The host selection is typically determined by an indication received from unpacking unit 74.

FIG. 10 is a block diagram that schematically shows details of GRU 142, in accordance with a preferred embodiment of the present invention. Incoming frames received from network 30 by GE MAC 78 are passed via a synchronization buffer 159 to a frame receiver 160, while the header of each frame is passed to MAC filter 144, as well. The MAC filter returns its filter vector to receiver 160, indicating which of hosts 22 are to receive this frame. If the filter vector is all zeroes, receiver 160 discards the frame. The frame receiver may also strip VLAN tags from the incoming frames. Assuming the filter vector contains one or more non-zero elements, receiver 160 places the frame contents in a receive FIFO buffer 162 and prepares a descriptor 164 indicating the hosts that are to receive the frame and, optionally, the VLAN priority. The descriptor and data are read out by packing unit 72 for use in constructing corresponding RNDIS messages to the hosts, as described above.

Looped-back frames from GTU 140 are likewise placed in receive FIFO buffer 162. Packing unit 72 processes these looped-back frames in the same manner that it processes frames received from network 30.

Like GTU 140, GRU 142 comprises performance counters 156 for each host, as well as global port counters. The filtering vector generated by MAC filter 144 is preferably used as a selection input to demultiplexer 158, in order to determine the counters that should receive each input of performance data.

As noted above, although preferred embodiments are described herein with reference to NIC sharing over IB fabric 24, the principles of the present invention can similarly be applied to fabrics and system area networks (SANs) of other types. Similarly, although these preferred embodiments relate to connection of hosts 22 to Ethernet network 30, NIC 28 may similarly be adapted to connect to other sorts of external networks, such as Asynchronous Transfer Mode (ATM) and Fibre Channel networks. Furthermore, the network processing functions performed by NIC 28 may be extended to higher-level protocols, including network- and transport-layer functions (such as TCP/IP) The higher-level function performed by NIC 28 may thus include, for example, checksum computations, fragmentation/reassembly, and even full processing of the TCP stack. Therefore, in the context of the present patent application and in the claims, the term "frames," used in reference to the data conveyed over a network, should be understood as comprehending aggregations of data sent over a network in substantially any format, regardless of whether these aggregations are referred to conventionally as frames, packets, datagrams, segments, cells or by any other name.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface device, comprising:
a fabric interface, for exchanging messages over a switch fabric with a plurality of host processors, the messages containing data;
a network interface, comprising one or more network ports for coupling to a network external to the switch fabric; and
message processing circuitry, coupled between the fabric interface and the network interface, so as to enable at least first and second host processors among the plurality of the host processors to use a single one of the network ports substantially simultaneously so as to transmit and receive frames containing the data over the network;
wherein the messages comprise outgoing messages sent by the host processors over the switch fabric, and wherein the message processing circuitry extracts the data from the outgoing messages and to generates the frames containing the extracted data for transmission over the network;
wherein the message processing circuitry assigns respective service levels to the host processors, and determines an order of processing the outgoing messages responsive to the service levels; and
wherein the fabric interface exchanges the messages with the host processors over respective transport connections between the host processors and the fabric interface, and wherein the message processing circuitry assigns each of the transport connections to a respective one of the service levels.

2. A device according to claim 1, wherein the fabric interface comprises a target channel adapter, and wherein the messages comprise data packets.

3. A device according to claim 1, wherein the network comprises an Ethernet network, and the frames comprise Ethernet frames.

4. A device according to claim 1, wherein each of the host processors is assigned to a respective one of the network ports, and transmits and receives the frames over the one of the network ports to which it is assigned.

5. A device according to claim 1, wherein at least one of the host processors is assigned to transmit and receive the frames over two or more of the network ports simultaneously.

6. A device according to claim 1, wherein the message processing circuitry comprises a plurality of scheduling queues having respective processing priorities, and is adapted to place each of the outgoing messages in a respective one of the scheduling queues responsive to the service levels assigned to the host processors that sent the messages.

7. A device according to claim 1, wherein each of the host processors is assigned to a respective one of the network ports of the network interface, and wherein the message processing circuitry comprises one or more scheduling queues for each of the one or more network ports, and is adapted to place the outgoing messages in the scheduling queues depending on the respective network ports to which the host processors that sent the messages are assigned.

8. A device according to claim 1, wherein the messages comprise incoming messages sent from the fabric interface to the host processors, and wherein the message processing circuitry is adapted to extract the data from the frames received over the network and to generate the incoming messages containing the extracted data to be sent to the host processors.

9. A device according to claim 8, wherein the message processing circuitry comprises a destination address filter, which is adapted to process destination addresses of the flames received over the network so as to indicate which of the host processors should receive the incoming messages over the switch fabric.

10. A device according to claim 9, wherein the fabric interface is adapted to exchange the messages with the host processors over respective transport connections between the host processors and the fabric interface, and wherein the message processing circuitry is adapted to determine the transport connections over which to send the incoming messages to the host processors indicated by the destination address filter.

11. A device according to claim 9, wherein the destination addresses processed by the destination address filter comprise at least one of a Media Access Control (MAC) address and a Virtual Local Area Network (VLAN) tag.

12. A device according to claim 9, wherein the frames received over the network comprise a multicast frame, and wherein the destination address filter is adapted to indicate that one or more of the hosts should receive the incoming messages containing the data extracted from the multicast frame.

13. A device according to claim 8, wherein the message processing circuitry is adapted to extract the data from two or more of the frames received over the network and destined for a given one of the host processors, and to generate one of the incoming messages containing the data extracted from the two or more of the frames.

14. A method for interfacing a plurality of host processors to a network, comprising:
providing a network interface device having one or more network ports connected to a network;
coupling the host processors to exchange messages containing data over a switch fabric with the network interface device, such that at least first and second host processors among the plurality of the host processors are assigned to use a single one of the network ports of the network interface device; and
processing the messages exchanged with the host processors so as to enable the first and second host processors to use the single one of the network ports substantially simultaneously to transmit and receive flames containing the data over the network;
wherein processing the messages comprises processing outgoing messages sent by the host processors over the switch fabric, so as to extract the data from the outgoing messages and to generate the flames containing the extracted data for transmission over the network;
wherein processing the outgoing messages comprises assigning respective service levels to the host processors, and determining an order of processing the outgoing messages responsive to the service levels; and
wherein coupling the host processors to exchange the messages comprises exchanging the messages over respective transport connections between the host processors and the network interface device, and wherein assigning the respective service levels comprises assigning each of the transport connections to a respective one of the service levels.

15. A method according to claim 14, wherein coupling the host processors comprises coupling the host processors and the network interface device to the switch fabric using respective channel adapters, and wherein the messages comprise data packets.

16. A method according to claim 14, wherein the network comprises an Ethernet network, and the frames comprise Ethernet frames.

17. A method according to claim 14, wherein coupling the host processors comprises assigning each of the host processors to a respective one of the network ports, so as to transmit and receive the frames over the one of the network ports to which it is assigned.

18. A method according to claim 14, wherein coupling the host processors comprises assigning at least one of the host processors to transmit and receive the frames over two or more of the network ports simultaneously.

19. A method according to claim 14, wherein assigning the respective services levels comprises placing each of the outgoing messages in a respective one of a plurality of scheduling queues having respective processing priorities, responsive to the service levels assigned to the host processors that sent the messages.

20. A method according to claim 14, wherein coupling the host processors comprises assigning each of the host processors to a respective one of the network ports so as to transmit the frames containing the extracted data through the one of the network ports to which it is assigned, and wherein processing the messages comprises providing one or more scheduling queues for each of the one or more network ports, and placing each of the outgoing messages in a respective one of the scheduling queues depending on the respective one of the network ports to which the host processor that sent the message is assigned.

21. A method according to claim 20, wherein coupling the host processors comprises opening one or more respective transport service instance over which to exchange the messages with each of the host processors, and wherein placing each of the outgoing messages in the respective one of the scheduling queues further comprises selecting the respective one of the scheduling queues for each of the outgoing messages responsive to the transport service instances over which the messages are sent by the host processors.

22. A method according to claim 14, wherein processing the messages comprises processing the frames received over the network so as to extract the data therefrom, and wherein the messages comprise incoming messages containing the extracted data, sent from the network interface device to the host processors.

23. A method according to claim 22, wherein processing the messages comprises providing a destination address liter, and processing destination addresses of the frames received over the network using the filter so as to indicate which of the host processors should receive the incoming messages over the switch fabric.

24. A method according to claim 23, wherein coupling the host processors to exchange the messages comprises exchanging the messages with the host processors over respective transport connections between the host processors and the network interface device, and processing the destination addresses comprises determining the transport connections over which to send the incoming messages to the host processors indicated by the destination address filter.

25. A method according to claim 23, wherein processing the destination addresses comprises processing at least one of a Media Access Control (MAC) address and a Virtual Local Area Network (VLAN) tag.

26. A method according to claim 23, wherein processing the frames received over the network comprises receiving a multicast frame, and wherein processing the destination addresses comprises determining, using the destination address filter, that one or more of the hosts should receive the incoming messages containing the data extracted from the multicast frame.

27. A method according to claim 22, wherein processing the frames comprises extracting the data from two or more of the frames received over the network that are destined for a given one of the host processors, and generating one of the incoming messages so as to contain the data extracted from the two or more of the frames.

28. A network interface device, comprising:
a fabric interface, for exchanging messages over a switch fabric with a plurality of host processors, including first and second host processors, the messages containing data and including outgoing messages sent by the host processors over the switch fabric;
a network interface, for coupling to a network external to the switch fabric; and
message processing circuitry, coupled between the fabric interface and the network interface, and for extracting the data from the outgoing messages and for generating frames containing the extracted data for transmission over the network via the network interface, and further determining whether any of the frames generated in response to one of the outgoing messages from the first host processor are destined to be received by the second host processor and, if so, to loop the data in the frames destined to be received by the second host processor back to the fabric interface, to be conveyed over the switch fabric to the second host processor without being transmitted over the network.

29. A device according to claim 28, wherein the message processing circuitry comprises a destination address filter, which is adapted to process destination addresses of the frames generated for transmission over the network so as to determine whether any of the frames are destined to be received by any of the host processors, including the second host processor.

30. A device according to claim 28, wherein the frames for transmission over the network comprise a multicast frame, which is destined to be received by both a remote recipient on the network and by the second host processor, and wherein the message processing circuitry is adapted both to generate the multicast frame for transmission over the network to the remote recipient and to loop the data in the multicast frame back to be conveyed to the second host processor.

31. A device according to claim 30, wherein the message processing circuitry is controllable so that the data in the multicast frame are looped back to the second host processor, while the transmission of the multicast frame over the network is blocked.

32. A network interface device, comprising:
a fabric interface, for exchanging messages over a switch fabric with a plurality of host processors, the messages containing data;
a network interface, for coupling to a network external to the switch fabric; and
message processing circuitry, coupled between the fabric interface and the network interface, so as to enable at least first and second host processors among the plurality of the host processors to transmit and receive frames containing the data over the network via the network interface, the message processing circuitry comprising a plurality of counters, which collect performance statistics individually for each of the first and second host processors regarding the frames transmitted and received via the network interface.

33. A method for interfacing a plurality of host processors to a network, comprising:
connecting a network interface device to a network;
coupling the host processors, including at least first and second host processors among the plurality of the host processors, to exchange messages containing data over a switch fabric with the network interface device, the messages including outgoing messages sent by the host processors over the switch fabric;
processing the messages so as to extract the data from the outgoing messages and to generate frames containing the extracted data for transmission over the network via the network interface device; and
determining whether any of the frames generated for transmission over the network in response to one of the outgoing messages from the first host processor are destined to be received by the second host processor and, if so, looping the data in the frames destined to be received by the second host processor back to the fabric interface, to be conveyed over the switch fabric to the second host processor without being transmitted over the network.

34. A method according to claim 33, wherein determining whether any of the frames are destined to be received by the second host processor comprises providing a destination address filter for each of one or more network ports of the network interface device, and processing destination addresses of the frames generated for transmission over the network using the filter so as to determine whether any of the frames are destined to be received by any of the host processors, including the second host processor.

35. A method according to claim 33, wherein processing the messages comprises determining that a multicast flame is destined to be received by both a remote recipient on the network and by the second host processor, and generating the multicast frame for transmission over the network to the remote recipient while looping the data in the multicast frame back to be conveyed to the second host processor.

36. A method according to claim 35, wherein processing the messages further comprises determining, responsive to a predefined policy, that the data in the multicast frame are to be looped back to the second host processor, while blocking the transmission of the multicast flame over the network.

37. A method for interfacing a plurality of host processors to a network, comprising:
connecting a network interface device to a network;
coupling the host processors to exchange messages containing data over a switch fabric with the network interface device;
processing the messages exchanged with the host processors so as to enable the first and second host processors to transmit and receive frames containing the data over the network via the network interface device; and
collecting performance statistics at the network interface device individually for each of the first and second host processors regarding the frames transmitted and received via the network interface device.

38. A network interface device, comprising:
a fabric interface, for exchanging messages over a switch fabric with a plurality of host processors, the messages containing data;

a network interface, comprising one or more network ports for coupling to a network external to the switch fabric; and message processing circuitry, coupled between the fabric interface and the network interface, so as to enable at least first and second host processors among the plurality of the host processors to use a single one of the network ports substantially simultaneously so as to transmit and receive frames containing the data over the network;

wherein the messages comprise outgoing messages sent by the host processors over the switch fabric, and wherein the message processing circuitry extracts the data from the outgoing messages and generates the frames containing the extracted data for transmission over the network; and wherein the message processing circuitry determines whether any of the frames generated for transmission over the network in response to one of the outgoing messages from the first host processor are destined to be received by the second host processor and, if so, to loop the data in the flames destined to be received by the second host processor back to the fabric interface, to be conveyed over the switch fabric to the second host processor without being transmitted over the network.

39. A device according to claim 38, wherein the message processing circuitry comprises a destination address filter for each of the network ports, which filter is adapted to process destination addresses of the flames generated for transmission over the network so as to determine whether any of the frames are destined to be received by any of the host processors, including the second host processor.

40. A device according to claim 38, wherein the frames for transmission over the network comprise a multicast frame, which is destined to be received by both a remote recipient on the network and by the second host processor, and wherein the message processing circuitry is adapted both to generate the multicast frame for transmission over the network to the remote recipient and to loop the data in the multicast frame back to be conveyed to the second host processor.

41. A device according to claim 40, wherein the message processing circuitry is controllable so that the data in the multicast frame are looped back to the second host processor, while the transmission of the multicast frame over the network is blocked.

42. A network interface device, comprising:
a fabric interface, for exchanging messages over a switch fabric with a plurality of host processors, the messages containing data;
a network interface, comprising one or more network ports for coupling to a network external to the switch fabric; and
message processing circuitry, coupled between the fabric interface and the network interface, so as to enable at least first and second host processors among the plurality of the host processors to use a single one of the network ports substantially simultaneously so as to transmit and receive flames containing the data over the network;
wherein the messages comprise incoming messages sent from the fabric interface to the host processors, and wherein the message processing circuitry extracts the data from the frames received over the network and generates the incoming messages containing the extracted data to be sent to the host processors;
wherein the message processing circuitry comprises a destination address filter, which processes destination addresses of the frames received over the network so as to indicate which of the host processors should receive the incoming messages over the switch fabric; and
wherein the messages further comprise outgoing messages sent by the host processors over the switch fabric, and wherein the message processing circuitry extracts the data from the outgoing messages and generates the flames containing the data extracted from the outgoing messages for transmission over the network, and wherein the destination address filter processes the destination addresses of the generated flames so as to determine whether any of the frames are destined to be received by any of the host processors and, if so, to loop the data in the frames back to the fabric interface, to be conveyed over the switch fabric to the host processors that are destined to receive them.

43. A network interface device, comprising:
a fabric interface, for exchanging messages over a switch fabric with a plurality of host processors, the messages containing data;
a network interface, comprising one or more network ports for coupling to a network external to the switch fabric; and
message processing circuitry, coupled between the fabric inter%ce and the network interface, so as to enable at least first and second host processors among the plurality of the host processors to use a single one of the network ports substantially simultaneously so as to transmit and receive frames containing the data over the network;
wherein the message processing circuitry comprises a plurality of counters, which collect performance statistics individually for each of the first and second host processors regarding the frames transmitted and received using the single one of the network ports.

44. A method for interfacing a plurality of host processors to a network, comprising:
providing a network interface device having one or more network ports connected to a network;
coupling the host processors to exchange messages containing data over a switch fabric with the network interface device, such that at least first and second host processors among the plurality of the host processors are assigned to use a single one of the network ports of the network interface device; and
processing the messages exchanged with the host processors so as to enable the first and second host processors to use the single one of the network ports substantially simultaneously to transmit and receive frames containing the data over the network;
wherein processing the messages comprises processing outgoing messages sent by the host processors over the switch fabric, so as to extract the data from the outgoing messages and to generate the frames containing the extracted data for transmission over the network; and
wherein processing the messages comprises determining whether any of the frames generated for transmission over the network in response to one of the outgoing messages from the first host processor are destined to be received by the second host processor and, if so, looping the data in the frames destined to be received by the second host processor back to the fabric interface, to be conveyed over the switch fabric to the second host processor without being transmitted over the network.

45. A method according to claim 44, wherein determining whether any of the frames am destined to be received by the second host processor comprises providing a destination address filter for each of the network ports, and processing destination addresses of the frames generated for transmission over the network using the filter so as to determine whether any of the frames are destined to be received by any of the host processors, including the second host processor.

46. A method according to claim 44, wherein processing the outgoing messages comprises determining that a multicast frame is destined to be received by both a remote recipient on the network and by the second host processor, and generating the multicast frame for transmission over the network to the remote recipient while looping the data in the multicast frame back to be conveyed to the second host processor.

47. A method according to claim 46, wherein looping the data back comprises determining, responsive to a predefined policy, that the data in the multicast frame are to be looped back to the second host processor, while blocking the transmission of the multicast frame over the network.

48. A method for interfacing a plurality of host processors to a network, comprising:

providing a network interface device having one or more network ports connected to a network;

coupling the host processors to exchange messages containing data over a switch fabric with the network interface device, such that at least first and second host processors among the plurality of the host processors are assigned to use a single one of the network ports of the network interface device; and processing the messages exchanged with the host processors so as to enable the first and second host processors to use the single one of the network ports substantially simultaneously to transmit and receive frames containing the data over the network;

wherein processing the messages comprises processing the frames received over the network so as to extract the data therefrom, and wherein the messages comprise incoming messages containing the extracted data, sent from the network interface device to the host processors;

wherein processing the messages comprises providing a destination address filter, and processing destination addresses of the frames received over the network using the filter so as to indicate which of the host processors should receive the incoming messages over the switch fabric; and wherein processing the messages further comprises processing outgoing messages sent by the host processors over the switch fabric, so as to extract the data from the outgoing messages and to generate the frames containing the data extracted from the outgoing messages for transmission over the network, and wherein processing the outgoing messages comprises processing the destination addresses of the generated frames using the destination address filter so as to determine whether any of the frames are destined to be received by any of the host processors and, if so, looping the data in the frames back to be conveyed over the switch fabric to the host processors that are destined to receive them.

49. A method for interfacing a plurality of host processors to a network, comprising:

providing a network interface device having one or more network ports connected to a network;

coupling the host processors to exchange messages containing data over a switch fabric with the network interface device, such that at least first and second host processors among the plurality of the host processors are assigned to use a single one of the network ports of the network interface device; and processing the messages exchanged with the host processors so as to enable the first and second host processors to use the single one of the network ports substantially simultaneously to transmit and receive frames containing the data over the network;

wherein the processing the messages comprises collecting performance statistics individually for each of the first and second host processors regarding the frames transmitted and received using the single one of the network ports.

* * * * *